United States Patent [19]

Sattlegger et al.

[11] 4,229,548
[45] Oct. 21, 1980

[54] PROCESS FOR THE PREPARATION OF ORGANOPOLYSILOXANE MOULDING COMPOSITIONS WHICH GIVE FINE-PORED ELASTOMERIC FOAM MOULDINGS

[75] Inventors: Hans Sattlegger, Odenthal; Hermann Schmidt, Linz; Karl Schnurrbusch, Leverkusen, all of Fed. Rep. of Germany

[73] Assignee: Bayer Aktiengesellschaft, Leverkusen, Fed. Rep. of Germany

[21] Appl. No.: 57,765

[22] Filed: Jul. 16, 1979

[30] Foreign Application Priority Data

Aug. 3, 1978 [DE] Fed. Rep. of Germany ....... 2834119

[51] Int. Cl.$^2$ ................................................ C08J 9/30
[52] U.S. Cl. ...................................... 521/110; 521/78; 521/154; 521/917; 528/33; 528/34; 528/901
[58] Field of Search ........................... 528/34, 901, 33; 521/110, 78, 154, 917

[56] References Cited

U.S. PATENT DOCUMENTS

| | | | |
|---|---|---|---|
| 3,560,442 | 2/1971 | Golitz et al. | 528/34 |
| 3,912,666 | 10/1975 | Spitzer et al. | 521/78 |
| 3,989,651 | 11/1976 | Lockwood et al. | 521/78 |

*Primary Examiner*—Morton Foelak
*Attorney, Agent, or Firm*—Sprung, Felfe, Horn, Lynch & Kramer

[57] ABSTRACT

In a process for the production of a plastic organopolysiloxane molding composition which can be stored under pressure and with exclusion of moisture, and which, on release of the pressure and under the action of water or atmospheric moisture, is converted into an elastomeric, fine-pored foam molding or foam coating, which comprises forming a mixture of an $\alpha,\omega$-dihydroxypolydiorganopolysiloxane with a silicon-containing crosslinking agent, introducing the mixture into the inner container of a two-container pack which consists of a rigid outer container and a flexible inner container located within the outer container and provided with a dispensing valve which extends to the exterior, and placing the mixture under pressure.

10 Claims, No Drawings

PROCESS FOR THE PREPARATION OF ORGANOPOLYSILOXANE MOULDING COMPOSITIONS WHICH GIVE FINE-PORED ELASTOMERIC FOAM MOULDINGS

Ready-to-use pastes based on organopolysiloxane have found a wide field of use as joint-sealing mastics. Such pastes, and the elastomeric mouldings obtained therefrom by crosslinking upon absorption of atmospheric moisture are an ideal mastic for a great variety of applications. Classical examples of such so-called one-component systems are described in, for example, French Patent specification 1,188,495, German Patent Specification 1,247,646 or W. Noll, Chemie und Technologie der Silicone (Chemistry and Technology of the Silicones), 1968, Verlag Chemie, Weinheim, chapter 8.1, especially pages 341 and 342.

However, for many fields of use it proved desirable, time and again, to fill such joints with compositions which were as voluminous as possible, that is to say, for example, with a foam. The joint-sealing mastics, based on polysiloxanes, hitherto available did not as yet offer this possibility. It is true that appropriate systems based on other plastics are known, but they suffer from substantial other disadvantages.

Various processes have also already been disclosed for the preparation of so-called silicone foams (for example the use of organopolysiloxanes possessing SiH groups, the addition of blowing agents, or filling of the polysiloxane compositions with hollow micro-spheres which may be of either organic or inorganic nature). However, all such foam systems still suffer from considerable shortcomings, for example that the components must be mixed only just before use or that the lightweight fillers offer no advantage, because of their intrinsic colour, their water content, their excessive density or their price.

The present invention now relates to a process for the preparation of plastic organopolysiloxane moulding compositions which can be stored under pressure and with exclusion of water, and which, on release of the pressure and under the action of water or atmospheric moisture, are converted, even at room temperature, into elastomeric, finepored foam mouldings or foam coatings, which compositions are prepared by mixing $\alpha,\omega$-dihydroxy-polydiorganopolysiloxanes with silicon compounds which serve as crosslinking agents and, optionally, with plasticisers, with fillers and with heavy metal salts and/or amines which are known to accelerate the crosslinking, which process is characterised in that the mixture, optionally together with a gas which is inert towards the constituents of the mixture, is filled into the inner container of a two-chamber container which consists of a rigid outer container and a flexible inner container, located within the outer container and provided with a dispensing valve which extends to the exterior, and is placed under pressure.

According to the invention, it is thus possible to prepare foam-like elastomers from organopolysiloxanes which crosslink at room temperature as a result of absorption of atmospheric moisture and which are used, for example, as a joint-sealing mastic in the building industry.

Surprisingly, it has been found that the gas with which the mixture in the pressure pack (two-chamber container) is treated dissolves, or becomes distributed, homogeneously in the paste. This gas, which drives the paste from the flexible container to the exterior through the valve head, at the same time serves as a medium for compressing the paste-gas mixture.

So-called cold-curing one-component systems, such as are employed according to the invention, usually contain the following constituents;

(1) an $\alpha,\omega$-dihydroxypolydiorganosiloxane; the organo group is normally a methyl or phenyl group. Smaller proportions of a halogenoalkyl group, such as, for example, a chloromethyl group, an alkenyl group, such as, for example, a vinyl group, or a cycloalkyl group, such as, for example, a cyclohexyl group, can also be present. The viscosity of the dihydroxypolydiorganosiloxanes is between about 500 and 2,000,000 cP (at 20° C.), depending on the end product requirements. Such homopolymers, heteropolymers or copolymers in general account for about 10% by weight to 90% by weight of the total amount of paste.

(2) The crosslinking substance is a polyfunctional organosilicon compound with more than two functional groups. This substances must be capable of "crosslinking" the substances mentioned under 1).

In preparing the one-component rubber compositions according to the invention by mixing the various substances listed under 1 to 4, the substances which serve as crosslinking agents under 2) can be bonded to the polymer ends, by splitting off one of the reactive groups, either during the mixing process or during the storage process or already in a type of premixing treatment.

Such organosilicon compounds can be:

(a) compounds according to the formula

$$R_a SiX_{4-a}.$$

wherein
a is from 0 to 2,
R can be alkyl, alkenyl, aryl or a corresponding halogenated radical, and
X is a reactive group which can react with a silanol group of the component 1).

The reactive group X can for example be an alkoxy, acyloxy, amino, cycloamino, acid amide or oxime group.

(b) disiloxanes, trisiloxanes and polysiloxanes produced by partial hydrolysis of the silanes mentioned under a), as illustrated by the formula for the disiloxane

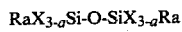

$$RaX_{3-a}Si-O-SiX_{3-a}Ra$$

and (c) the compounds shown in German Patent specification No. 1,794,197.

(3). Fillers of the generally used type, employed individually or, as is mostly the case, as a mixture, for example reinforcing fillers (highly disperse silica produced by flame hydrolysis, titanium dioxide, carbon black and the like), or fillers such as quartz powder, chalk (natural or precipitated), plastic powders and pigments of all kinds.

(4) Auxiliaries of very diverse types, such as (a) additives, of very diverse structure, which act as adhesion promoters, for example compounds described under 2), containing aminoalkyl, epoxyalkyl or other reactive alkyl groups, or compounds as described under 2) in which a is 0 and various radicals X are present on one silicon atom.

(b) additives which for example act as driers and/or adhesion promoters, such as, for example, complex esters of titanic acid (compare, for example, German Patent specification 1,258,087).

(c) catalysts for accelerating the silanol/crosslinking agent or crosslinking agent/water reaction, such as metal soaps of the metals from manganese to lead, or amino compounds.

(d) added solvents, such as, for example, toluene or petroleum ether.

(e) additives described as plasticisers, such as, for example, $\alpha,\omega$-trialkylsiloxypolydiorganosiloxane having a viscosity of 10 to 1,000,000 cSt/20° C., polybutenes, petrol hydrocarbons or phosphoric acid esters.

(f) additives which improve the fungistatic activity of the mastics.

(g) additives which improve the physical properties of the mastics, such as, for example, the stability to hot air, the heat conductivity, the electrical conductivity or the chemical resistance.

(h) additives which modify the mechanical properties of the mastics, such as substances of category $R_2SiX_2$, wherein R and X can have the same meaning as under 2).

According to the invention, the finished mixture is packaged in a two-chamber system under a pressure of 2 bar to about 30 bar, preferably of about 10 bar to about 15 bar.

If the mixture is filled together with an inert gas—which embodiment is also practicable—suitable inert gases are dry gases such as, for example, air, nitrogen, $CO_2$ or noble gases. Preferably, air or nitrogen is employed.

Suitable two-chamber containers are, for example, the pressure cans which are in themselves known and are described, for example, in German Auslegeschrift No. 2,103,447.

The containers in general are a seamless aluminum container or a seamed tinplate container. The bottom may be closed by, for example, a plastic plug. The inner container is made from a flexible material, for example polyethylene. The outlet valve is a conventional paste valve or flip valve, of the type commercially available.

The product is packaged before the valve is clinched, after which the pressure is applied through the bottom orifice.

On releasing the mixture from the pressurised container, the desired elastomeric moulding composition is formed under the action of moisture (for example from the air). It was surprising that under the conditions according to the invention a uniform foam, which issues smoothly from the pack, is produced under the conditions according to the invention. On releasing from the pack, the gas under pressure which is dissolved or dispersed in the paste expands and a microporous, closed-cell foam (the porosity depending on the amount of gas) is formed, which after having been squirted out of the container continues to "rise" somewhat, similarly to a yeast-containing dough, this rise being particularly advantageous when the material is used for joint-sealing mastics, because of the pressure exerted against the sides of the joint. In this way it is possible to produce a ready-to-use one-component silicone foam of low density without employing expensive, coloured or water-containing fillers and without wetting agents or blowing agents.

The present invention will now be explained in more detail with the aid of some examples.

EXAMPLE 1

250 g of a silicone paste of specific gravity 1.15, consisting of 45.2 parts by weight of an $\alpha,\omega$-dihydroxypolydimethylsiloxane of viscosity 50,000 cSt/20° C., 20.0 parts by weight of an $\alpha,\omega$-bis-(trimethylsiloxy)-polydimethylsiloxane of viscosity 1,000 cSt, 4.5 parts by weight of di-(ethyl acetoacetate)-diisobutyl-titanate, 4.5 parts by weight of finely disperse, pyrogenic silica, 20.0 parts by weight of chalk, 1.0 part by weight of titanium dioxide, 0.07 part by weight of carbon black, 0.7 part by weight of dibutyl-tin dilaurate and 4.0 parts by weight of di-(N-methylbenzamido)-methylethoxysilane are packaged, with 100 ml of air, in the inner container of a pressure-pack tinplate can of 500 ml total volume and the can is sealed with a clinch flip valve. Compressed air under 10 bar is introduced as the pressure medium between the inner and outer container.

After ejection, an elastomeric foam having a specific gravity of about 0.79 is produced.

EXAMPLE 2

220 g of the abovementioned paste are mixed with 130 ml of air, and compressed under 10 bar, as described in Example 1. After ejection, a foam having a specific gravity of about 0.69 is obtained.

EXAMPLE 3

200 g of a silicone paste of specific gravity 1.03, consisting of 61.5 parts by weight of $\alpha,\omega$-dihydroxypolydimethylsiloxane of viscosity 50,000 cSt/20° C., 24.1 parts by weight of $\alpha,\omega$-bis-(trimethylsiloxy)-polydimethylsiloxane of viscosity 1,000 cSt, 4.0 parts by weight of ethyl triacetoxysilane, 9.5 parts by weight of finely disperse, pyrogenic silica and 0.01 part by weight of dibutyl-tin diacetate are packaged with 150 ml of air and compressed under a pressure of 12 bar.

After expansion, a silicone foam of specific gravity about 0.58 is produced.

EXAMPLE 4

280 g of a silicone paste of specific gravity 1.21, consisting of 45 parts by weight of $\alpha,\omega$-dihydroxypolydimethylsiloxane of viscosity 50,000 cSt/20° C., 18.0 parts by weight of $\alpha,\omega$-bis-(trimethylsiloxy)-polydimethylsiloxane of viscosity 1,000 cSt, 5.0 parts by weight of di-N-triethoxysilmethylene-allylamine, 7.0 parts by weight of finely disperse, pyrogenic silica, 21.5 parts by weight of chalk and 3.0 parts by weight of titanium dioxide are packaged with 115 ml of air and stored under a pressure of 11 bar. After ejection, a foam of specific gravity about 0.81 is obtained.

EXAMPLE 5

260 g of a silicone paste of specific gravity 1.25, consisting of 43.3 parts by weight of $\alpha,\omega$-dihydroxypolydimethylsiloxane of viscosity 50,000 cSt/20° C., 15.5 parts by weight of $\alpha,\omega$-bis-(trimethylsiloxy)-polydimethylsiloxane of viscosity 1,000 cSt/20° C., 6.0 parts by weight of bis-(N-methylbenzamido)-methylethoxysilane, 29.0 parts by weight of chalk, 1.5 parts by weight of titanium dioxide, 4.5 parts by weight of finely disperse, pyrogenic silica and 0.02 part by weight of dibutyl-tin diacetate are packaged with 133 ml of air and exposed to a pressure of 10 bar. A foam of specific gravity about 0.75 is obtained.

EXAMPLE 6

430 grammes of a paste consisting of 43,3 parts by weight α,ω-dihydroxypolydimethylsiloxane (50 000 cSt/20° C.)

15,5 parts by weight α,ω-Bis-(trimethylsiloxy)-polydimethylsiloxane (1000 cSt/20° C.)

6,0 parts by weight α,ω-Bis-(N-methylbenzamido)-methyl ethoxy silane 29,0 parts by weight of chalk 1,5 parts by weight of titanium dioxide 4,5 parts by weight of pyrogenic silica 0,02 parts by weight of dibutyltindilaurate were filled in the inner container of a pressure-pack tinplate can under a pressure of 10 bar. After injection an elastomeric form having a specific gravity of about 0.80 is obtained.

What is claimed is:

1. In a process for the production of a plastic organopolysiloxane molding composition which can be stored under pressure and with exclusion of moisture, and which, on release of the pressure and under the action of water or atmospheric moisture, is converted into an elastomeric, fine-pored foam molding or foam coating, which comprises forming an mixture of an α,ω-dihydroxypolydiorganopolysiloxane with a silicon-containing crosslinking agent, introducing the mixture into the inner container of a two-container pack which consists of a rigid outer container and a flexible inner container located within the outer container and provided with a dispensing valve which extends to the exterior, and placing the mixture under a moisture-free inert gaseous pressure of about 2 to about 30 bar.

2. A process as claimed in claim 1 wherein the α,ω-dihydroxypolydiorganosiloxane is one containing an alkyl, halogenoalkyl, alkenyl, cycloalkyl or aryl group.

3. A process as claimed in claim 1 wherein the α,ω-dihydroxypolydiorganosiloxane is one having a viscosity at 20° C. between 500 and 2,000,000 cSt/20° C.

4. A process as claimed in claim 1 wherein the α,ω-dihydroxypolydiorganosiloxane is present in an amount of 10 to 90% by weight, based on the total mixture.

5. A process as claimed in claim 1 wherein the crosslinking agent is one having the general formula $$R_a SiX_{4-a} \tag{I}$$

wherein a is from 0 to 2, R represents an alkyl, alkenyl or aryl radical or a corresponding halogenated radical, and X represents a group capable of reacting with a silanol group of the α,ω-dihydroxypolydiorganosiloxane.

6. A process as claimed in claim 5 wherin the group X is an alkoxy, acyloxy, amino, cycloamino, acid amide or oxime group.

7. A process as claimed in any of claims 1 to 4 whereinin the crosslinking agent is a disiloxane, trisiloxane or polysiloxane producible by the partial hydrolysis of a compound of general formula I given in claim 5.

8. A process as claimed in claim 7 wherein the crosslinking agent is a compound of the general formula $$R_a X_{3-a} Si\text{-}O\text{-}SiX_{3-a} R_a$$

wherein R, a and X are as defined in claim 5.

9. A process as claimed in claim 7, wherein the mixture additionally contains solvents one or more plasticizers, fillers and/or crosslinking catalysts and additives to improve fungistatic activity, physical and mechanical properties.

10. A process as claimed in claim 1 wherein there is also introduced into the inner container a gas which is inert to the constituents of the mixture.

* * * * *